(12) United States Patent
Sekiguchi (10) Patent No.: US 7,243,151 B2
(45) Date of Patent: Jul. 10, 2007

(54) HOME GATEWAY APPARATUS

(75) Inventor: Kiyonori Sekiguchi, Machida (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 732 days.

(21) Appl. No.: 10/106,786

(22) Filed: Mar. 27, 2002

(65) Prior Publication Data

US 2002/0156899 A1  Oct. 24, 2002

(30) Foreign Application Priority Data

Apr. 20, 2001  (JP)  ............................. 2001-123219

(51) Int. Cl.
- G06F 15/16 (2006.01)
- H04L 12/28 (2006.01)
- G06F 3/00 (2006.01)

(52) U.S. Cl. .................. 709/227; 370/401; 715/740; 709/249

(58) Field of Classification Search .............. 709/224, 709/225, 232, 236, 245, 227, 249; 370/401; 379/102; 715/733, 740
See application file for complete search history.

(56) References Cited

U.S. PATENT DOCUMENTS

| | | | | |
|---|---|---|---|---|
| 5,167,024 A | * | 11/1992 | Smith et al. ................. | 713/322 |
| 5,528,675 A | * | 6/1996 | Chen ..................... | 379/106.01 |
| 6,157,950 A | * | 12/2000 | Krishnan .................... | 709/223 |
| 6,198,479 B1 | * | 3/2001 | Humpleman et al. ....... | 715/733 |
| 6,359,892 B1 | * | 3/2002 | Szlam ......................... | 370/401 |
| 6,453,687 B2 | * | 9/2002 | Sharood et al. .............. | 62/127 |
| 6,496,862 B1 | * | 12/2002 | Akatsu et al. .............. | 709/224 |
| 6,523,696 B1 | * | 2/2003 | Saito et al. .................. | 709/223 |
| 6,526,514 B1 | * | 2/2003 | Nguyen et al. ............. | 713/300 |
| 6,580,950 B1 | * | 6/2003 | Johnson et al. ................ | 700/17 |
| 6,633,988 B2 | * | 10/2003 | Watts et al. ................. | 713/322 |
| 6,735,619 B1 | | 5/2004 | Sawada | |
| 6,826,607 B1 | * | 11/2004 | Gelvin et al. ................ | 709/224 |
| 6,870,555 B2 | * | 3/2005 | Sekiguchi ................... | 715/740 |
| 6,928,576 B2 | | 8/2005 | Sekiguchi | |
| 6,975,635 B2 | * | 12/2005 | Takeyama et al. .......... | 370/401 |

(Continued)

FOREIGN PATENT DOCUMENTS

JP  2000-125036  4/2000

(Continued)

OTHER PUBLICATIONS

"Newton's Telecom Dictionary" 16th Expanded and Updated Edition, 2000, p. 138.*

(Continued)

Primary Examiner—Saleh Najjar
Assistant Examiner—V. Korobov
(74) Attorney, Agent, or Firm—Greenblum & Bernstein, P.L.C.

(57) ABSTRACT

A home gateway apparatus that can control the power in each current carrying unit, and lower the power consumption is provided; by dividing the apparatus into a first system that has a minimum function to connect with the Internet, and a second system that has necessary functions to execute applications on the Ethernet®. Both the first and second systems are controlled individually, so that the power is turned on/off separately. Also, when the second system without the power is turned on, an Ethernet® connection controller is provided as an interface to avoid the interface connectivity problem, and an IP address is automatically obtained after turning on the power.

8 Claims, 4 Drawing Sheets

U.S. PATENT DOCUMENTS

| | | | |
|---|---|---|---|
| 2002/0112070 A1* | 8/2002 | Ellerbrock et al. | 709/238 |
| 2002/0178398 A1 | 11/2002 | Sekiguchi | |
| 2003/0001883 A1* | 1/2003 | Wang | 345/736 |

FOREIGN PATENT DOCUMENTS

| | | |
|---|---|---|
| JP | 2000-188623 | 7/2000 |
| JP | 2000-253035 | 9/2000 |
| JP | 2000-307623 | 11/2000 |
| JP | 2000-312211 | 11/2000 |
| JP | 2001-077840 | 3/2001 |
| JP | 2001-320415 | 11/2001 |
| JP | 2002-305531 | 10/2002 |

OTHER PUBLICATIONS

English Language Abstract of JP 2001-077840.
English Language Abstract of JP 2000-125036.
English Language Abstract of JP 2001-320415.
English Language Abstract of JP 2000-253035.
English Language Abstract of JP 2000-188623.
English Language Abstract of JP 2002-305531.
English Language Abstract of JP 2000-312211.
English Language Abstract of JP 2000-307623.

* cited by examiner

HOME GATEWAY APPARATUS

BACKGROUND OF THE INVENTION

1. Field of the Invention

This invention relates to a home gateway apparatus that connects the Internet, which is an outside infrastructure, or wireless mobile communication terminals to a home network.

2. Description of Related Art

Recently, because of the progress in the Internet usage technologies, the Internet has been widely used not only in companies, but in home activities such as e-mail, Internet shopping, Internet phone, web search, etc. At home, a multiple of personal computers and peripheral devices can be connected to a network, so that a multiple of personal computers can share the same peripheral devices.

Home gateway apparatuses have also been invented, with a router function at home, so that the Internet as the outside infrastructure, or wireless mobile communication terminals can be connected to a home network. Such home gateway apparatuses are connected to the Internet continuously, and personal computers or peripheral devices at home are accessed via the Internet.

These technologies are provided by merging/combining Internet provider services, network technologies such as Ethernet®, Internet protocols (IP), and operating systems of personal computers.

However, when a home gateway apparatus has a continuous connection to the Internet, the apparatus needs to be turned on all the time to handle accesses from infrastructures outside of home, so that the apparatus is always operational. Therefore, there has been a problem of increasing power consumption.

SUMMARY OF THE INVENTION

This invention is provided in view of above problem. The object of the invention is to provide a home gateway apparatus that can control the power in each current carrying unit, and lower the power consumption.

The home gateway apparatus of the present invention is divided into a first system that has a minimum function to connect with outside infrastructures, and a second system that has necessary functions to execute applications on the home network. Both the first and second systems are controlled individually, so that the power is turned on/off separately.

Therefore, the power is provided only to the first system that has a continuous connection to the outside infrastructures, and the second system remains without the power, when not in use. Thus, it is possible to substantially reduce power consumption.

Also, in this invention, when the second system without the power is turned on, an IP interface by the Ethernet® is provided as an interface to avoid the interface connectivity problem (no connection). The IP address is automatically obtained after turning on the power, so that the interface connectivity problem is avoided.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The embodiment of the present invention is further explained in the following, in reference to the above-described drawings.

Figure 1:
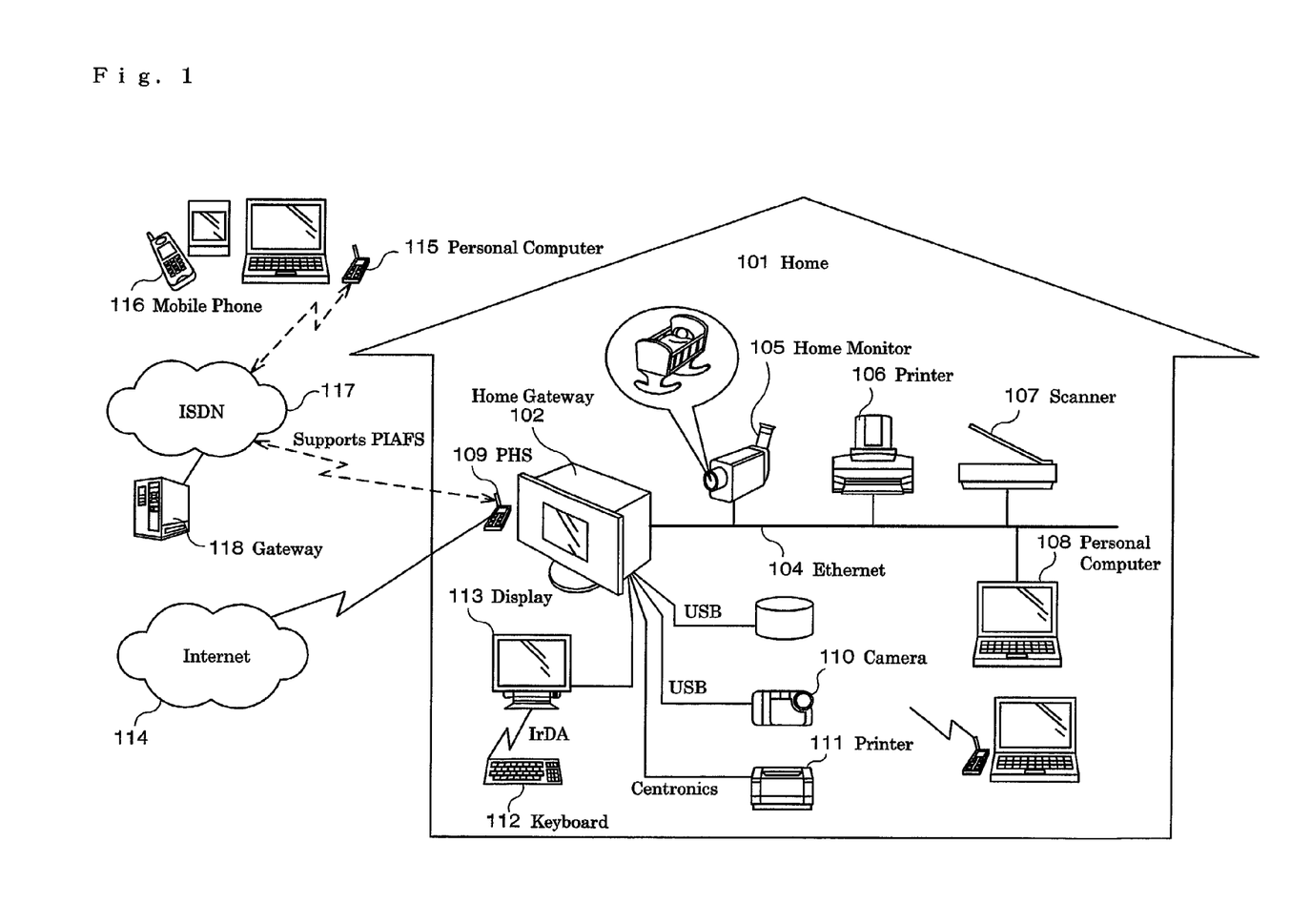
FIG. 1 shows an example of the home network usage equipped with a home gateway apparatus according to an embodiment of the present invention.

FIG. 1 shows an example of usage of the home network equipped with a home gateway apparatus according to an embodiment of the present invention. It is a conceptual rendering to illustrate an entire network at a home 101 and outside infrastructures.

A home gateway apparatus 102 is provided in the home 101. The home gateway apparatus 102 performs connection and route control between the outside infrastructures and home network. The home gateway apparatus 102 is provided with an Ethernet® interface, USB interface, and Centronics interface, as network interfaces of the second system.

Ethernet® 104 is a home network equipped at home. In FIG. 1, peripheral devices with the Ethernet® addresses such as a home monitor 105, printer 106, scanner 107, and personal computer 108 are connected to the home network. A camera 110 is connected to a USB interface and a printer 111 is connected to a Centronics interface.

Additionally, a keyboard 112 that is an operational section for operating the second system (later described), a display apparatus 113 that is a display section for the second system, are connected to the home gateway apparatus 102. The keyboard 112 is a transportable infrared wireless keyboard.

Further, the home gateway apparatus 102 is provided with PCMCIA slot, which is a slot for a PHS card, to be connected with wireless mobile communication terminals. By inserting a PHS card in the PCMCIA slot, the home gateway apparatus 102 is capable of performing data communication at 64 Kbps with wireless mobile communication terminals, which are outside infrastructures, via the PHS card.

Also, the home gateway apparatus 102 is continuously connected to the Internet 114, which is one of the outside infrastructures, via an Internet service provider.

A personal computer 115 outside of home, by equipping a PHS card, is connected to an ISDN 117 that supports PIAFS, and is capable of PHS communication with the home gateway apparatus 102 via the Internet. A gateway 118 located on the ISDN 117 provides services such as image and protocol conversion to display PHS data from the home gateway apparatus 102 on a mobile phone. A mobile phone 116 is a portable phone with a display to view images of a home monitor 105.

With the above network structure, a single home gateway apparatus 102 can perform a connectivity control between the peripheral devices that are connected to the home network and the outside infrastructures, control the peripheral devices that are connected to the home network, and display obtained images of the home monitor 105 on the mobile phones via the wireless PHS.

Figure 2:
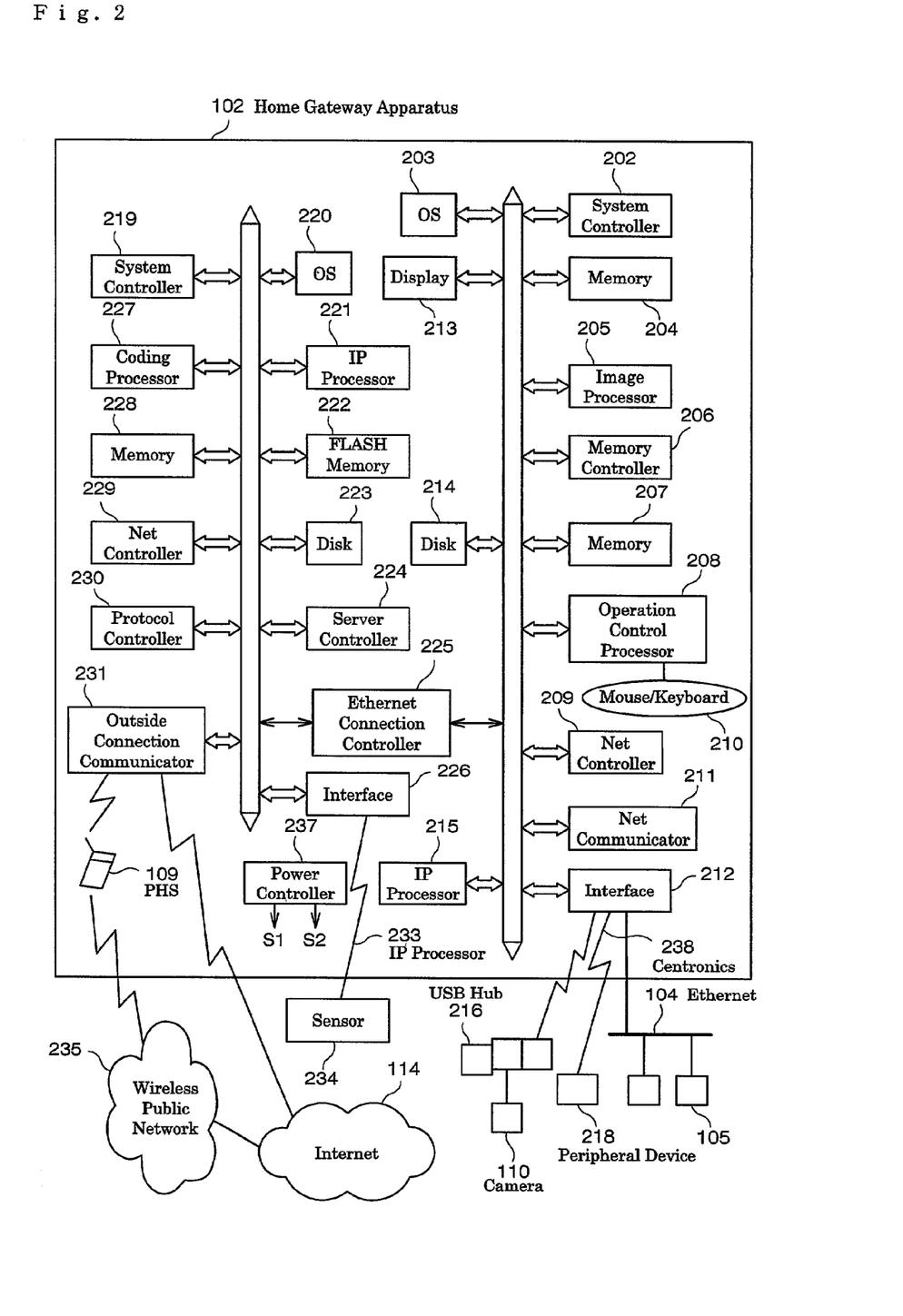
FIG. 2 is a functional block diagram of the home gateway apparatus according to the embodiment of the invention.

FIG. 2 is a functional block diagram illustrating an internal structure of the home gateway apparatus 102. The home gateway apparatus 102 is divided into the first system that includes a functional block necessary for a continuous connection with the outside infrastructures, such as the Internet 114, with the continuous power, and the second system that includes a functional block necessary for a connectivity control for the peripheral devices on the home network, and that is independent from the first system and is capable of turning on/off the power.

The first system of home gateway apparatus 102 includes a system controller 219, operating system (OS) 220, IP processor 221, flash memory 222, disk 223, server controller 224, Ethernet® connection controller 225, interface 226, encryption processor 227, memory 228, net controller 229, protocol controller 230, outside connection communicator 231, all of which are connected via an internal bus.

The system controller 219 is a CPU, and controls the entire system based on the operating system 220. In this embodiment, Linux OS is used in the operating system 220. It is preferable that the operating system 220 of the first system is started easily from a flash memory and consumes less power.

The IP processor 221 controls routing, based on IP address information obtained by analyzing an IP packet, and performs a firewall function. A flash memory 222 is a nonvolatile memory that stores the operating system 220. The disk 223 is an expansion memory and executes applications. The server controller 224 is a controller that performs server functions that is a standard implementation for Linux, includes functions as a DHCP server (later described).

The Ethernet® connection controller 225 is an interface between the first and second systems. All of the information between the systems that is handled via the Ethernet® connection controller 225, is communicated based on the IP addresses.

The interface 226 detects status changes of a sensor 234, which is equipped at home. The sensor 234 is an interface of RS232-C, and notifies the interface 226 of each sensor bit (1/0) status. An example of the sensor 234 is a temperature sensor for a fire detector.

The encryption processor 227 executes processes for decrypting data and detecting cipher keys, for reception from the outside infrastructures, and executes processes for encrypting data and adding cipher key information, for transmission from home to outside. The memory 228 is used for executing an encryption process and an operation of the operating system 220.

The net controller 229 stores a routing table for routing selection, setting information for a firewall, and cipher key information, functions as a router, DHCP server, web server.

The protocol controller 230 controls a communication protocol executed by an outside connection communicator 231. The outside connection communicator 231 is a communicator that implements physical layers for connecting to mobile communication terminals (PHS), and for connecting to the Internet (Ethernet®), and can be connected to a wireless mobile communication terminal 232 and the Internet 236. In this embodiment, the mobile communication terminal 232 is a PHS card body. The Internet 236 is a broad network that is structured with an Internet service provider.

The second system of the home gateway apparatus 102 includes a system controller 202, operating system 203, memory 204, image processor 205, memory controller 206, memory 207, operation control processor 208, net controller 209, net communicator 211, interface 212, display 213, disk 214, and IP processor 215, all of which are connected via an internal bus.

The system controller 202 is a CPU that controls the entire system and the operating system 203 in this embodiment is Windows® Me OS (by Microsoft). The operating system of the second system needs to operate a variety of applications compared to the first system of the operating system 220; therefore, an OS that can handle such demands is employed.

The memory 204 is managed by the operating system 203, which stores application programs (software). In the present embodiment, the memory 204 has a 64 MB capacity. The image processor 205 executes image processes necessary for displaying images on the display 213. The memory controller 206 controls reading/writing of the memory 207, which is not managed by the operating system 203. The memory 207 is a memory that the various applications use to temporarily store data. The operation control processor 208 is an interface that connects operational sections such as the keyboard 112 and a mouse (operational section 210).

The net controller 209 checks for existence of data forwarding from the second system to the first system, and stores/controls a routing table. The net communicator 211 controls the Ethernet® connection controller 225 and communication via the interface 212. The interface 212 implements physical layers of USB interface and Internet, and executes communication control on each physical layer. The IP processor 215 obtains and manages IP addresses, and stores IP addresses transmitted from the DHCP (Dynamic Host Configuration Protocol) server of the first system via the Ethernet® connection controller 225.

The USB hub 216 is a hub to which a multiple of peripheral devices of the USB interface can be connected. Each peripheral device 218 is connected to the interface 212, with its own interface. The Centronics 238 adheres to the IEEE 1284 standard, and can be connected to a printer, or the like.

The home gateway apparatus 102 of the present invention is provided with a power controller 237 that can control to individually turn on/off the power of the first and second systems. The power for the first system is always on because of the continuous connection with the outside infrastructures, however, the power at the second system can be turned off, when not in use. That is, the power controller 237 turns on the power of the second system, according to the instruction of the operator, and turns off the power of the second system, according to the instruction of the operator, when the system is not in use.

In FIG. 2, various functions (operating system, etc.) that are provided when the system controllers 202 and 219 execute software applications, are illustrated by a functional block; similar to a hardware, such as a memory. Therefore, the software such as operating systems 203 and 220, is not connected to the internal bus, parallel to the hardware, such as a memory.

Next, operations of the home gateway apparatus 102 with the above structure are explained in the following. First, the operation of the first system is illustrated. The first system is provided with a continuous power by the power controller 237, because of the continuous connection with the outside infrastructures. When connecting to the outside infrastructures via dial-up, the first system can be turned on every time.

The server controller 224 in the first system periodically receives e-mail data from the Internet service provider (mail server) via the connection line (ISDN) provided by the outside connection communicator 231, and saves the data in the disk 223. Such functions are available by executing protocols such as "Send mail" and "POP", which are the standard implementation of the Linux OS.

The encryption processor 227 performs data encryption, according to the IP layer necessary for the IPv6 as an Internet address, and IKE (Internet Key Exchange). When the received data is IPsec, the encryption processor 227 performs processes for IKE and decryption (MD5, SHA-1, DES, and 3-DES).

The server controller 224 provides an access service to the disk 223 by using the telnet protocol in response to a login from a remote location. To provide the access service, the server controller 224, protocol controller 230, and outside connection communicator 231 operate in relations to one another.

The Linux OS of the first system (operating system 220) is illustrated hereafter. The Linux OS is an embedded system, which has a slightly different structure from the operation systems for Windows®. The power is frequently turned on/off at the first system; therefore, the flash memory 222 is used to initiate the system, instead of using the operating system 220 as a startup disk. Thus, the startup time is reduced, and the disk breakdown is avoided at the same time. The Linux OS for the first system uses $1/60$ to $1/70$ capacity of the Windows®, therefore, the capacity of the flash memory 222 can be about 4 MB.

The Ethernet® connection controller 225 has an internal Ethernet® hub function, and is connected to the first and second systems via the Ethernet® hub. Upon establishing an interface with the second system, the DHCP server, which is one of the functions of the server controller 224, assigns an IP address to the second system. Therefore, it is possible to establish the interface without synchronizing the first system with the current-carrying timing of the second system.

Next, the operations of the second system are illustrated. The second system implements an OS for Windows®, and the system controller 202 and operating system 203 operate independently from the first system. Similar to the ordinal personal computers, the disk 214 implements the operating system 220 and the operating system 220 is used for startups.

Upon receiving the instruction from the user interface of the operation control processor 208, applications are executed, and by a liaison with the net controller 209, net communicator 211, and the interface 212, services are provided to the peripheral devices 218 that are connected to the Ethernet® 104, USB hub 216, and Centronics 238, which are the home infrastructures.

The second system can perform data communication with the outside infrastructures via the first system, by requesting the Ethernet® connection controller 225 for an IP address, when the power is turned on, to obtain the IP address. The IP address inside of the second system is a private IP address. All of the USB and Centronics interfaces are controlled by the operating system 203.

Next, displaying camera images of the home monitor 105 in the home network by a mobile communication terminal is illustrated, as an example of the operation of the home gateway apparatus 102 according to the embodiment. In the usage embodiment shown in the FIG. 1, image data of the home monitor 105 is displayed on the mobile phone 116, by the home gateway apparatus 102, PHS card 109, ISDN 117, and gateway 118.

The home monitor 105, which is connected to the Ethernet® 104, owns an IP address for the camera, and periodically updates obtained camera images as homepage images, which is viewable from remote locations, and is create by the camera. The homepage of the home monitor 105 can be viewed by starting a browser of the outside infrastructure or of home network, designating the IP address, and accessing the homepage.

First, the gateway 118 is accessed by designating a URL of the gateway 118, from an Internet mode of a mobile phone 116. The gateway 118 here is registered as an unofficial Internet site server. The gateway 118 forwards the next image data to the connected mobile phone 116, so that the user can designate the IP address of the home gateway apparatus 102.

The gateway 118 refers to a table that has the IP address of the home gateway apparatus 102 associated with the phone number of a PHS card 109, and communicates with the PHS card 109, by dialing via ISDN 117.

The PHS card 109 of the home gateway apparatus 102 terminates the line connection after an incoming call, and immediately starts an operation to dial an outgoing call to the gateway 118. This process is intended to charge the home gateway apparatus 102 for the line connection fees, between the gateway 118 and home gateway apparatus 102. Thus, the gateway 118 is only charged for the connection fee to notify the home gateway apparatus 102 of the incoming call from the mobile phone 116. Therefore, the service usage fee of the gateway 118 does not exceed too much above the basic service fee.

The gateway 118 accesses the web server functions of the home monitor 105, by designating the homepage address of the home monitor 105 from the PHS communication with the PHS card 109, and downloads the homepage data of the home monitor 105. The homepage data of the home monitor 105 is a motion JPEG that is periodically updated, and is handled as motion pictures (10 pictures/second) for a continuous load, and as a still picture for one time load. The gateway 118, after a thinning process of the captured image to be displayed in the frame size of the mobile phone 116, establishes a data transmission to the mobile phone 116. Depending on the setting, the image can be displayed as a real-time image, which is automatically updated for the newest image every several seconds.

Next, the relationship of the power control and the interface of the home gateway apparatus 102 is illustrated with reference to the FIGS. 3 and 4.

Figure 3:
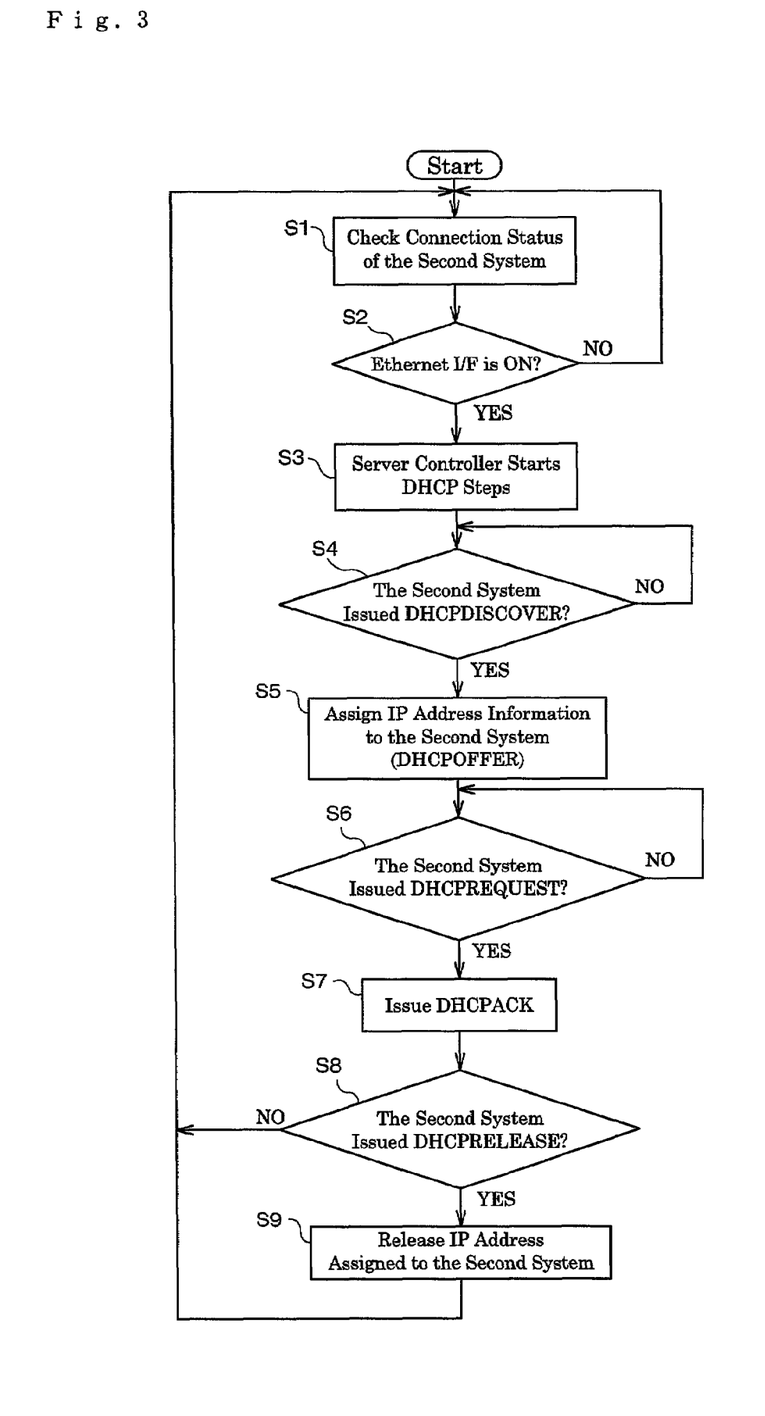
FIG. 3 is an operational flowchart of the first system of the home gateway apparatus according to the embodiment of the invention.

FIG. 3 is a flowchart illustrating processes at the first system of the home gateway apparatus 102. The first system is turned on and is continuously connected to the outside infrastructures.

The first system periodically monitors the connectivity conditions of the Ethernet® connection controller 225, to determine whether the power of the second system is turned on (Step 1). If the power is turned on at the second system to which the power has not been provided before, the second system of the Ethernet® connection controller 225 is turned on. If it is detected that the second system is turned on (Step 2), the server controller 224 starts a preparation for assigning the IP address to the second system as a DHCP server (Step 3).

The second system starts the steps to obtain IP address when the power is turned on, and issues a broadcast message (DHCPDISCOVER) to the Ethernet® connection controller 225.

When the first system detects the broadcast message (DHCPDISCOVER) from the Ethernet® connection controller 225 (Step 4), the DHCP server of the first system assigns the IP address information to the second system (Step 5). That is, IP address information (DHCPOFFER)

including the IP address of the second system, subnet mask value, and MAC address of the DHCP client (second system) issuing the broadcast message (DHCPDISCOVER) is transmitted (Step 5).

When the IP address has been obtained based on the IP address information (DHCPOFFER), the second system issues the selection/confirmation of the DHCP (DHCPREQUEST).

Upon detecting the DHCPREQUEST issued by the second system, the first system recognizes that the IP address assigned by the DHCP server has been set at the second system, and issues DHCPACK (Step 7). Consequently, the IP address is assigned by the DHCP server of the first system, to the second system at which the power is turned on, after the first system with the continuous power.

When a user's desired application is completed, the second system with the power, on the other hand, turns off the power by the user's instruction to the power controller 237. In this case, when the second system detects an instruction to turn off the power, the second system releases the interface of the Ethernet® connection controller 225. This interface release is performed by the second system's issuing DHCPRELEASE.

Upon detecting the DHCPRELEASE issued by the second system (Step 8), the first system releases the IP address assigned to the second system, and returns to the initial condition (Step 9).

Figure 4:
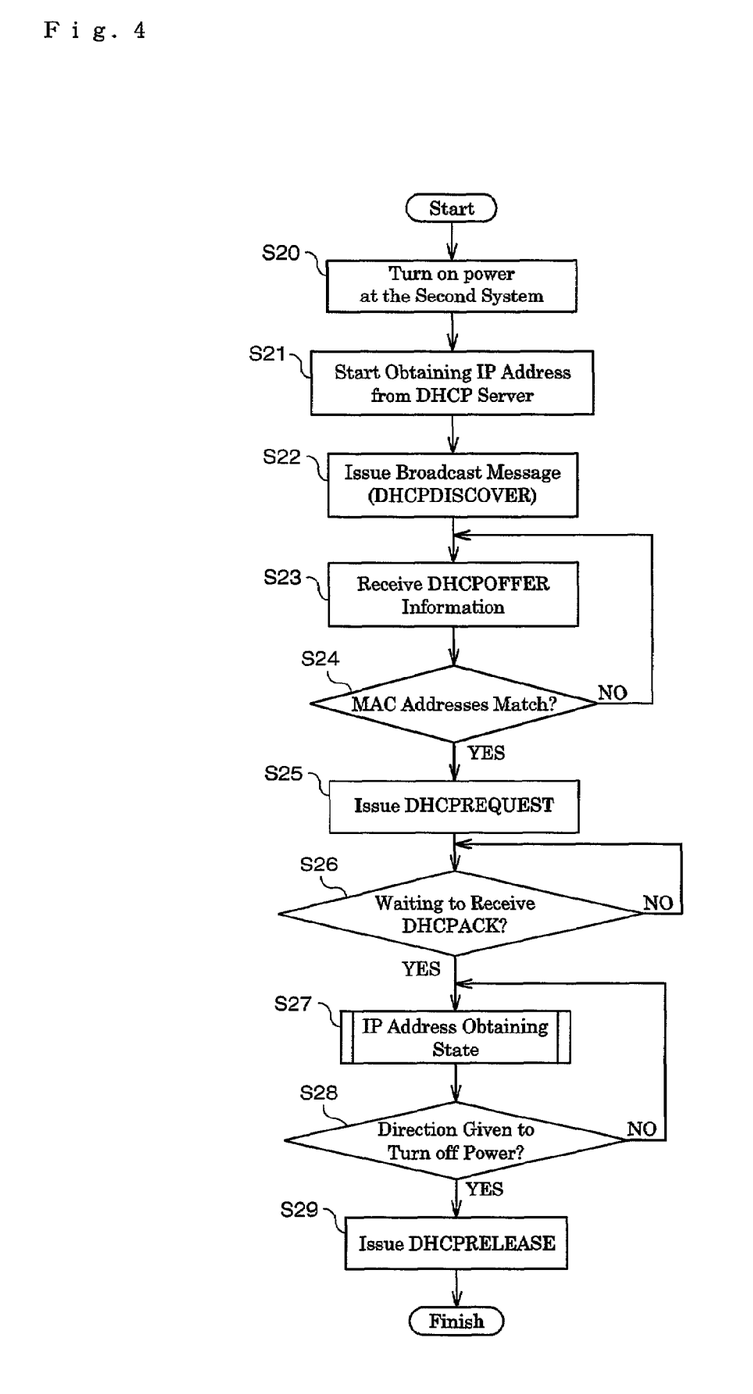
FIG. 4 is an operational flowchart of the second system of the home gateway apparatus according to the embodiment of the invention.

FIG. 4 is a flowchart illustrating processes by the second system of the home gateway apparatus 102. The power at the second system here is initially turned off, to correspond with the flowchart in FIG. 3.

When a user intends to use a printer that is one of the applications in the second system, he/she gives an instruction to the power controller 237 to turn on the power at the second system (S-2). Likewise, when power is independently turned on at the second system (Step 20), the process to obtain the IP address from the DHCP server starts (Step 21). Initially, the broadcast message (DHCPDISCOVER) is issued to obtain the IP address (Step 22).

As described above, in response to the DHCPDISCOVER issued by the second system, the first system transmits IP address information as the DHCPOFFER. The IP address information transmitted by the first system includes the MAC address of the machine which transmitted a broadcast message.

Upon receiving the DHCPOFFER (Step 23), the second system checks the set MAC address. If the MAC address matches with its own MAC address, the second system recognizes that the information is for the DHCPDISCOVER issued by the second system (Step 24). The second system uses the IP address set by the DHCPOFFER and the subnet mask value, to perform communication as described below. The second system issues a command for selecting/confirming DHCP (DHCPREQUEST) (Step 25), and waits for the DHCPACK from the DHCP server of the first system, in response to the DHCPREQUEST (Step 26). Upon receiving the DHCPACK, the operation for obtaining the IP address is completed, and the IP address becomes usable (Step 27).

When the user has finished using the application at the second system, on the other hand, the second system can be turned off independently from the first system, to save energy, and only the second system can be left without power.

Upon detecting the instruction given to turn off the power at the second system, to the power controller 237 (Step 28), the second system issues DHCPRELEASE that requests for IP address's release, to release the interface of the Ethernet® connection controller 225 (Step 29). Accordingly, when the second system is turned off, the IP address, which has been allocated to the second system, becomes released.

According to the above-described embodiment, the home gateway apparatus 102 is provided with unit structures divided into the first system that has the minimum function to be connected to the outside infrastructures, and the second system that has functions necessary for executing applications of home network. The power at the first and second systems (S-1 and S-2) are turned on/off separately, therefore, it is possible to turn on the first system with a continuous connection to the outside infrastructures, but to leave the second system turned off, when not in use, to substantially reduce power consumption.

Also, when the second system without power is actually turned on, to avoid the interface connectivity problems (no connection), the IP interface by the Ethernet® is used for the interface. Therefore, by automatically obtaining the IP address after starting the current carrying, it is possible to avoid problems with the interface connectivity.

Further, the abnormal condition (e.g., in case of fire) that is detected by the sensor 234 is notified to the mobile communication terminal, and the image of the home monitor 105 set inside of home is displayed on the mobile communication terminal. Therefore, it is possible to use the home gateway apparatus 102 as a security function to check the home, from a remote location.

The present invention is not limited to the above-described embodiments, and various variations and modifications may be possible without departing from the scope of the present invention.

This application is based on the Japanese Patent Application No. 2001-123219 filed on Apr. 20, 2001, entire content of which is expressly incorporated by reference herein.

What is claimed is:

1. A gateway apparatus, comprising:
a first system, comprising:
a first controller configured to control the first system; and
a communicator configured to be connected to a network outside a premise in which the gateway apparatus is placed;
a second system, comprising:
a second controller configured to control the second system; and
an interface configured to be connected to a peripheral apparatus located inside the premise in which the gateway apparatus is placed; and
a power controller configured to provide electrical power to the first system without providing electrical power to the second system when the gateway apparatus turns ON, the power controller providing electrical power to the second system when the power controller detects an instruction from the peripheral apparatus to provide electrical power to the second system, the first system being distinct from the second system.

2. The gateway apparatus of claim 1, wherein the first system further comprises a server controller that assigns an IP address to the second system when the power controller provides the electrical power to the second system.

3. The gateway apparatus of claim 2, wherein the first system further comprises a connection controller that connects the first system to the second system, based on the IB address assigned to the second system by the server controller.

4. The gateway apparatus of claim 1, wherein the connection controller comprises an Ethernet interface.

5. The gateway apparatus of claim 1, wherein the interface connects to at least one type of peripheral apparatus.

6. The gateway apparatus of claim 1, wherein the server controller includes a DHCP (Dynamic Host Configuration Protocol) server function.

7. The gateway apparatus of claim 1, wherein the communicator connects to a mobile communication apparatus.

8. The gateway apparatus of claim 1, wherein the communicator connects to the Internet.

* * * * *